UNITED STATES PATENT OFFICE.

CHARLES GORDON RICHARDSON, OF TORONTO, CANADA.

PROCESS OF REFINING NICKEL AND COPPER MATTES.

SPECIFICATION forming part of Letters Patent No. 518,117, dated April 10, 1894.

Application filed May 18, 1893. Serial No. 474,693. (No specimens.)

*To all whom it may concern:*

Be it known that I, CHARLES GORDON RICHARDSON, of the city of Toronto, in the county of York and Province of Ontario, Canada, have invented a certain new and useful Improvement in Processes of Refining Nickel and Copper Mattes, of which the following is a specification.

This invention has for its object the separation and refining of nickel, or nickel and copper in nickel and copper mattes or speiss so as to free the nickel from admixture with either one of these metals or both.

In practicing my invention, the mattes or speiss, after being finely pulverized, are carefully roasted to expel all sulphur and arsenic and to obtain the metals in the form of oxides, care being taken also to insure that the iron is converted as far as possible into the ferric or peroxidized condition. The resulting oxides of nickel and iron, or nickel, iron and copper are then placed in a suitable receptacle, or if preferred, retained in the roasting chamber or furnace, such for instance, as a Brückner, or other revolving furnace, and then dry hydrochloric acid gas, superheated or otherwise, passed over them, by which means the metallic oxides are converted into chlorides. If the hydrochloric acid gas be passed over the oxides at a temperature slightly below the volatilizing or subliming point of nickel chloride, or if the oxides be kept at such a temperature by heating the receptacle or otherwise, it will be found that the whole of the ferric chloride will have distilled or volatilized off from the nickel or the nickel and copper chlorides and may then be condensed in a suitable chamber adjoining the chloridizing vessel, while the hydrochloric acid, together with the water formed in the reaction, may then be condensed apart from the ferric chloride and used in the production of fresh gas or may, after passing through drying chambers, be caused to pass through other chloridizing vessels or returned to the first chloridizing chamber by means well understood by all chemical engineers. The nickel chloride remaining behind in the vessel (if copper be absent) may then be oxidized in a current of superheated steam, while the hydrochloric acid resulting from such decomposition may be recovered by any of the usual and well known means. In the case of copper being present, after the whole of the iron is separated, as described above, the temperature of the chloridizing chamber is raised either by further heating the hydrochloric gas as it is passed into the chamber or by heating the chloridizing vessel or otherwise, as may be preferred up to a moderate red heat or to any temperature below the subliming or volatilizing point of the copper chloride, and above the subliming or volatilizing point of the nickel chloride, by which means the whole of the nickel chloride is obtained free from copper and condensed in a receptacle apart from the chloridizing vessel. The chlorides thus separated may then be reduced to their respective oxides either by superheated steam or oxidized and reduced to metals by any other suitable and well known means, and the hydrochloric acid formed in the reaction recovered in the usual manner.

The hydrochloric acid gas used in my process may be produced in the usual way by acting on common salt with sulphuric acid and then conducting the evolved gas through a drying chamber filled with fused calcium chloride, or other suitable drying material, whereby it is freed from all moisture, and the dried gas then heated if need be, by passing it through heated tubes or otherwise and then conducted into the chloridizing vessel, substantially as described.

By thus describing my invention or process, what I claim as novel, and desire to secure by Letters Patent, is the following:

1. The process herein set forth of converting a mixture of iron, nickel and copper oxides into ferric chloride, and nickel and copper chlorides, by treating it with dry hydrochloric acid gas, and then separating the resulting chlorides by fractional distillation or sublimation, preferably in an atmosphere of hydrochloric acid gas or other neutral gas, substantially as described.

2. The process herein set forth of converting a mixture of iron and nickel oxides into chlorides by treating it with dry hydrochloric acid gas at a temperature below the volatilizing or subliming point of nickel chloride and the simultaneous distillation and separation of the ferric chloride as formed, substantially as described.

3. The process herein set forth of converting a mixture of nickel and copper oxides into chlorides by treating it with dry hydrochloric acid gas and then raising the temperature to a point below the point of volatility of copper chlorides and above the volatilizing point of nickel chloride, and separating the two chlorides by fractional distillation, substantially as described.

4. The process herein set forth of converting a mixture of nickel and copper chlorides by heating the same to a point below the volatilization or subliming point of copper chloride and above the volatilizing or subliming point of nickel chloride and separating the two chlorides by fractional distillation or sublimation preferably in an atmosphere of hydrochloric acid gas or other neutral gas, substantially as described.

5. The process herein set forth of separating a mixture of nickel and iron chlorides by means of fractional distillation or sublimation in an atmosphere of hydrochloric acid gas or other neutral gas, substantially as described.

6. The process herein set forth of treating a mixture of iron, nickel and copper chlorides, which consists in separating them from each other by fractional distillation or sublimation in an atmosphere of hydrochloric acid gas or other neutral gas, substantially as described.

Toronto, May 12, 1893.

CHARLES GORDON RICHARDSON.

In presence of—
  A. M. NEFF,
  T. ERNEST.